(12) United States Patent
Nobili

(10) Patent No.: US 11,867,313 B2
(45) Date of Patent: Jan. 9, 2024

(54) ADJUSTMENT DEVICE FOR A WATER DELIVERY UNIT

(71) Applicant: Fabrizio Nobili, San Vittore (CH)

(72) Inventor: Fabrizio Nobili, San Vittore (CH)

( * ) Notice: Subject to any disclaimer, the term of this patent is extended or adjusted under 35 U.S.C. 154(b) by 0 days.

(21) Appl. No.: 17/896,598

(22) Filed: Aug. 26, 2022

(65) Prior Publication Data

US 2023/0062715 A1  Mar. 2, 2023

(30) Foreign Application Priority Data

Aug. 26, 2021  (EP) .................................... 21193341

(51) Int. Cl.
*F16K 31/524* (2006.01)
*F16K 1/52* (2006.01)
*F16K 31/56* (2006.01)

(52) U.S. Cl.
CPC ........ *F16K 31/52408* (2013.01); *F16K 1/523* (2013.01); *F16K 31/56* (2013.01); *Y10T 137/9464* (2015.04)

(58) Field of Classification Search
CPC ........ F16K 1/52; F16K 1/523; F16K 31/3855; F16K 31/56; F16K 31/086; F16K 31/08
See application file for complete search history.

(56) References Cited

U.S. PATENT DOCUMENTS

| 5,758,863 A * | 6/1998 | Buffet ................. F16K 31/3855 251/28 |
| 10,232,386 B1 * | 3/2019 | Lu ........................ F16K 11/0743 |
| 10,775,813 B2 * | 9/2020 | Nobili .................... F16K 31/404 |
| 11,002,371 B2 * | 5/2021 | Xia ........................ F16K 31/404 |

(Continued)

FOREIGN PATENT DOCUMENTS

| EP | 2865928 B1 | 8/2017 |
| JP | 2006-022638 A | 1/2006 |

(Continued)

OTHER PUBLICATIONS

WO-2014076242-A1, Gross et al., Machine Translation (Year: 2014).*

(Continued)

*Primary Examiner* — Daphne M Barry
(74) *Attorney, Agent, or Firm* — Oliff PLC

(57) ABSTRACT

An adjustment device for a water delivery unit includes a valve body extending along a longitudinal axis with a water inlet and outlet, a shutter arrangement to control water flow from the inlet to the outlet, a first actuating member movable along the longitudinal axis to arrange shutter arrangement into opening and closing positions to respectively enable/disable the passage of water and a second actuating member rotatable about the longitudinal axis to vary the opening position of the shutter arrangement to adjust a flow rate of the water exiting the valve body. The device has a manual control member coupling with the first and second actuating members and configured to receive a manual action by a user for opening, closing and adjusting the flow rate of the water. The second actuating member cooperates with the shutter arrangement through a cam arrangement for varying the opening position of the shutter arrangement.

19 Claims, 11 Drawing Sheets

(56) References Cited

U.S. PATENT DOCUMENTS

| | | | |
|---|---|---|---|
| 2015/0115183 A1* | 4/2015 | Nobili | F16K 31/52408 |
| | | | 251/65 |
| 2019/0338500 A1 | 11/2019 | Berghoff et al. | |
| 2021/0239236 A1 | 8/2021 | Tempel et al. | |

FOREIGN PATENT DOCUMENTS

| | | | |
|---|---|---|---|
| JP | 2007-046770 A | 2/2007 | |
| WO | WO-2014076242 A1 * | 5/2014 | ............. E03C 1/042 |
| WO | 2020/165001 A1 | 8/2020 | |
| WO | 2020/165002 A1 | 8/2020 | |

OTHER PUBLICATIONS

Feb. 10, 2022 Search Report issued in European Patent Application No. 21193341.

* cited by examiner

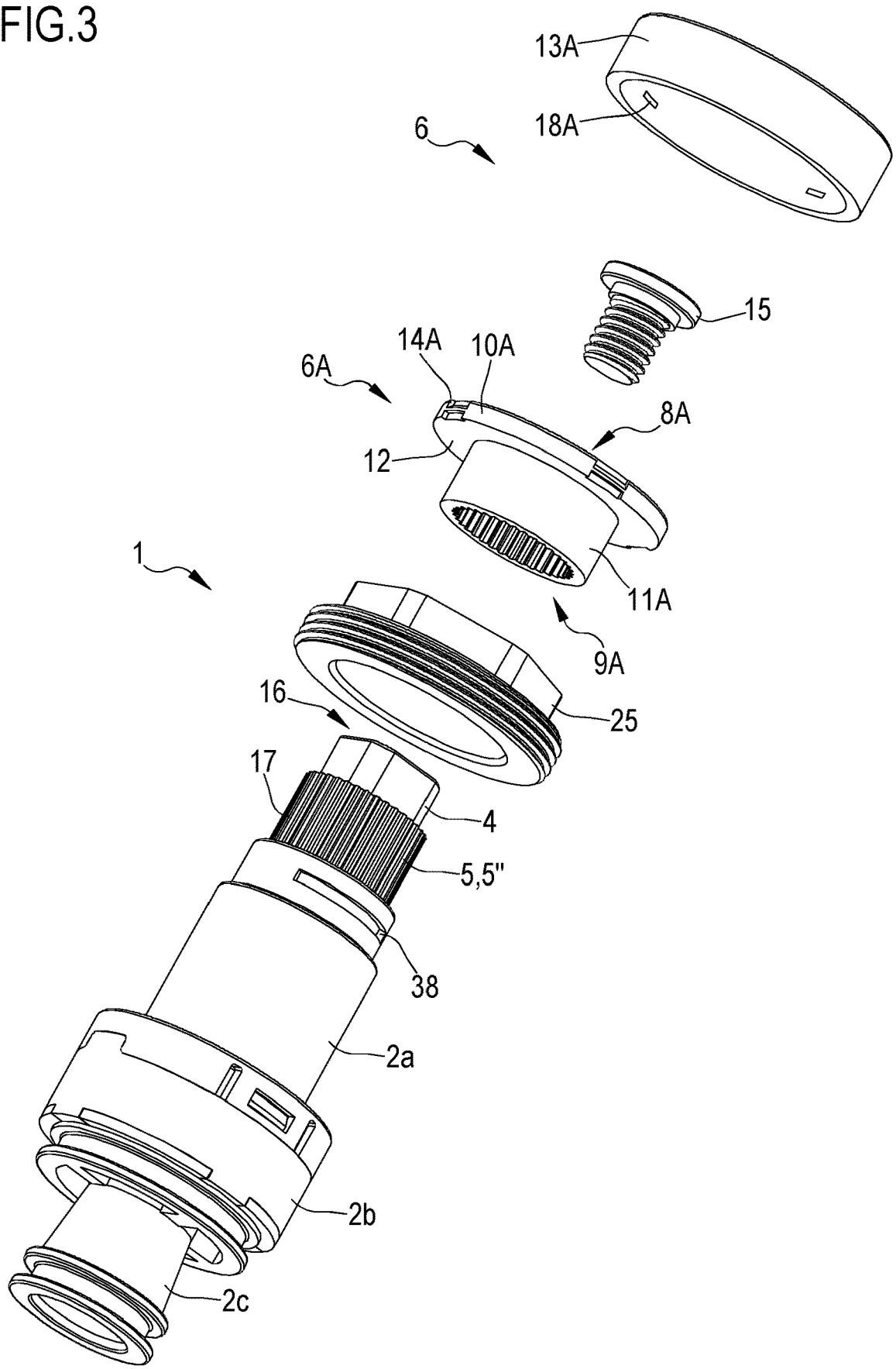

ADJUSTMENT DEVICE FOR A WATER DELIVERY UNIT

BACKGROUND OF THE INVENTION

The invention relates to an adjustment device for a water delivery unit, in particular a manually actuatable device for opening, closing and adjusting the water flow rate in delivery units provided in showers, sinks for kitchens or bathrooms etcetera.

STATE OF THE ART

Devices for opening and closing water in a shower or sink or washbasin for kitchens or bathrooms are known.

Such devices are mounted on a panel or on a wall of the delivery unit and are configured to be actuated by a user's hand.

One type of these devices provides using a control unit and an electrovalve which, by electronic actuation, closes and opens the water flow to be delivered. Despite being very easy to use and aesthetically pleasant, such devices are rather bulky and also expensive, due to their structural complexity; such devices, in addition, are hard to be mounted, also due to the presence of electrical wires to be connected.

Another type of device, of the manual type, provides the presence of a ceramic large screw rotatable on a rotation shaft, to intercept the water flow.

The rotation shaft may be rotated by means of a button, placed on the panel, and actuatable by pressing with a finger.

This last type of device has the limit of requiring the user to apply a high pressing force on the button which is greater as the water pressure in the distribution water circuit increases.

In order to reduce the effort required by the user, there are some solutions which provide to use reduction gears suitable for reducing the pressure to be applied on the aforesaid button; such solutions, by contrast, involve an increase in the structural complexity and size of the adjustment device.

In order to overcome the aforesaid limitations, the present Applicant has developed a manual opening and closing system, subject of Patent EP2865928, which has turned out to be highly effective, performing and simple to be manufactured.

Such system provides a button which, by slightly pressing with a finger, may be manually switched into two different positions to open and close the water flow and may be further rotated to adjust the flow rate of the water exiting.

Despite the device disclosed in EP2865928 has turned out to be a great improvement and able to successfully solve the limitations of the aforementioned prior art systems, there is still great room for improvement in the present water adjustment devices.

OBJECTS OF THE INVENTION

An object of the invention is to improve the present water adjustment devices.

Another object of the invention is to provide an adjustment device configured so as to improve the actuation of the shutter arrangement; in particular, the invention aims at providing a solution enabling to further ease the opening, closing and water flow adjustment operations to a user.

An additional object of the invention is to provide a solution that makes it possible to constructively simplify the adjustment device and to concurrently improve the operation performance.

A still additional object is to provide a solution reducing the size of the device and the space required for mounting it on a shower panel or another similar wall of a delivery unit, making it possible to also obtain advantages as regards its appearance, in particular referring to the possibility of obtaining a mounting configuration perfectly flush with the above-mentioned wall or panel surface.

These and other objects are reached by a system as defined in the appended claims.

BRIEF DESCRIPTION OF THE INVENTION

According to the invention, an adjustment device as defined in the appended claims is provided.

In particular, thanks to its specific structural configuration, more precisely thanks to the manual control member, the actuation members and the cam arrangement, the present adjustment device is advantageous in the operation, particularly in the actuation and adjustment of the shutter arrangement.

Furthermore, the specific structural conformation of the actuation members and of the control member involves an advantageous structural simplification.

The adjustment device according to the invention is easy to be manufactured and is particularly suitable to be applied to showers, sinks and other water delivery structures.

BRIEF DESCRIPTION OF THE DRAWINGS

The invention shall be better understood and implemented with reference to the appended drawings which show some exemplary and non-limiting embodiments, in which:

FIG. 3 is an exploded perspective view of the device in FIG. 1 provided with a first version of a manual control member;

DETAILED DESCRIPTION OF THE INVENTION

Figures 1, 2:
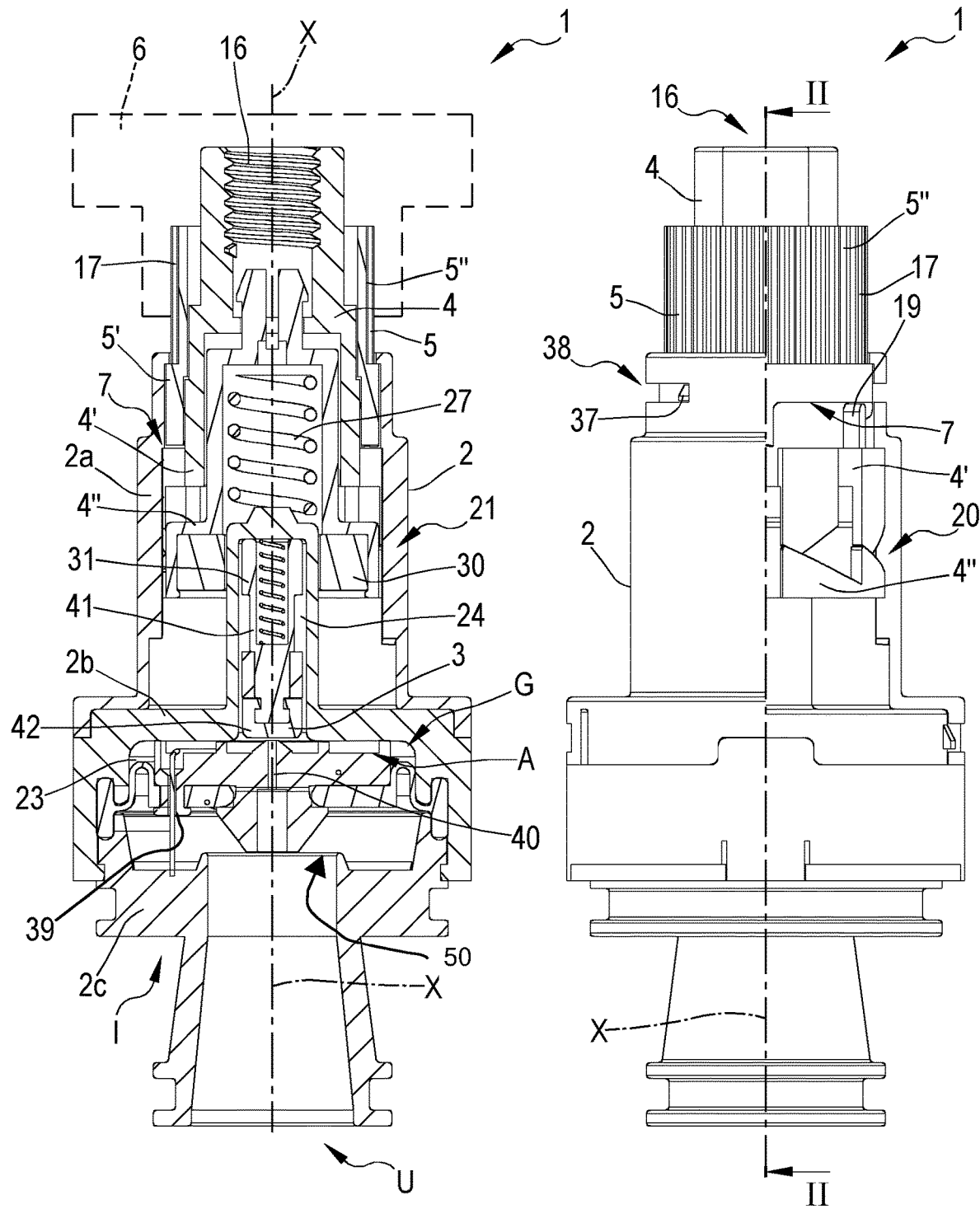
FIG. 1 is a view of an adjustment device according to the invention, with magnetic actuation and in an opening position for the water flow.
FIG. 2 is a longitudinal section taken along the plane II-II in FIG. 1 in which a manual control member is schematically shown.

Referring to the above-mentioned Figures, it must be noted that, for ease of explanation, similar elements of different embodiments have been referred to with the same reference number.

An adjustment device for showers, sinks and other structures in which a water delivery unit is provided is referred to as 1.

Such adjustment device 1 makes it possible to open, close and adjust the flow rate of the water delivered by conveniently acting on a manual control and makes it possible to deliver water through a hand shower connected to a shower panel or through a diffuser nozzle mounted on the sink.

In general, the adjustment device 1 according to the invention provides:
  a valve body 2, 2a, 2b, 2c extending along a longitudinal axis X and provided with an inlet I and an outlet U for water,
  a shutter arrangement 3 configured to control a water flow from the inlet I to the outlet U,
  a first actuating member 4 axially movable along the longitudinal axis X to arrange the shutter arrangement 3 in an opening position A and in a closing position C to respectively enable/disable the passage of the water flow;
  a second actuating member 5 rotatable about the longitudinal axis X to vary the opening position A of the shutter arrangement 3 so as to adjust a flow rate of the water flow exiting the valve body 2, 2a, 2b, 2c;
  a manual control member 6; 6A; 6B, 6C coupling with both the first actuating member 4 and with the second actuating member 5 and configured to receive a manual action by a user for opening, closing and adjusting the flow rate of the water flow,
wherein the second actuating member 5 cooperates with the shutter arrangement 3 through a cam arrangement 7 to vary the opening position A of the shutter arrangement 3.

More versions of the adjustment device 1 which can be configured with an actuation according to more than one variant, such as providing a magnetic or mechanical actuating assembly for the shutter arrangement, will be hereinafter disclosed.

Referring to FIGS. 1 to 11, a first version of the adjustment device 1, provided, for exemplary and non-limiting purposes, with an actuation of the magnetic type, will be now described. Briefly, in this version, a transmission assembly 21 of the magnetic type, configured to transmit the movement of the first actuation member 4 to the shutter arrangement 3 by means of a magnetic force, is interposed between the shutter arrangement 3 and the first actuation member 4.

To this end, the transmission assembly 21 includes a magnet member 30 cooperating with a metallic o ferromagnetic portion 31 of the shutter arrangement 3.

More precisely, the shutter arrangement 3 includes a pin 41 on which the aforesaid metallic or ferromagnetic portion 31 is obtained which is intended to interact with the magnet member 30 to receive from them the magnetic force required such to obtain an axial displacement along the axis X, as disclosed again hereinafter.

The valve body 2 is defined by a first body portion 2a, a second body portion 2b and a third body portion 2c.

The first body portion 2a and the second body portion 2b are mutually coupled.

Inside the first body portion 2a and the second body portion 2b at least part of the first actuating member 4 and second actuating member 5 and the shutter arrangement 3 are housed.

The second body portion 2b is shaped so as to innerly define a housing chamber 24 projecting towards the end occupied by the control member 6, is closed on top and houses the shutter arrangement 3, in particular the pin 41.

Inside the housing chamber 24, a spring 26 is present urging the pin 41 outwardly, precisely towards a disc-membrane assembly G which will be disclosed later.

In the third body portion 2c, the inlet I and outlet U for water are obtained.

The third portion 2c of the valve body is shaped so as to act as a diffuser element for the flow of exiting water.

The third body portion 2c is coupled with the second body portion 2b so as to mutually delimit a chamber inside which a disc-membrane assembly G is housed.

Briefly, the disc-membrane assembly G includes a disc including an elastically deformable membrane and a rigid disc on which the membrane is mounted.

The disc is mounted between the third portion 2c and the second portion 2b of the valve body and serves as a washer between them.

The disc-membrane assembly G provides a water inlet hole 39 and a water discharge hole 40.

The disc-membrane assembly G, depending on the position reached, enables or blocks the flow of water exiting through a flow-rate water passage section 50.

An intermediate position of the disc-membrane assembly G determines a reduction of the aforesaid section of flow-rate water passage section 50 and, therefore, a partialization of the water flow delivered.

Water enters, through the inlet hole 39, into a reception chamber 23 delimited between an upper transversal wall of the second portion 2b of the valve body and the disc-membrane assembly G.

Water from the distribution network and entering the reception chamber 23 may be at a water pressure ranging from 0.1 and 10 bars, a pressure to which the disc of the aforementioned assembly G is submitted.

The shutter arrangement 3 includes a washer end 42 coupled with the pin 41 and configured to shut the aforesaid discharge hole 40 when a closing position C is reached. The closing position C is well visible in FIG. 6, where it can be seen that the disc-membrane assembly G closes the flow-rate water passage section 50.

Through the inlet hole 39, the water present in the chamber 23 results in pressing the disc downwards, partially deforming the elastic membrane of the disc-membrane assembly G.

The washer end 42 occludes the discharge hole 40, such that the water pressure (from the top downwards in FIG. 6) pushing the membrane and the disc or rigid disc-shaped element against the flow-rate water passage section 50 is equal to the pressure of water entering the inlet hole 39. The different areas of the surfaces submitted to the pressure on the upper side and lower side of the disc-shaped element determines the condition of the disc-shaped element and membrane pushing against the flow-rate water passage section 50.

It is clear that a few-millimetre-displacement of the shutter arrangement 3 is enough to trigger a displacement of the disc G for closing and opening the water flow through the lower diffuser.

Thanks to the magnetic actuation, touching lightly, with a very slight pressure, the manual control 6 with a finger, is enough to move the shutter and the magnet into the disc trigger position, for opening or closing the flow.

The greater or shorter distance of the end 42 from the discharge hole 40, adjusted by acting on the second actuating member 5 (as will be better clear in the hereinafter description), determines a desired variation and setting of the flow rate of water exiting through the flow-rate water passage section 50.

Figure 7:
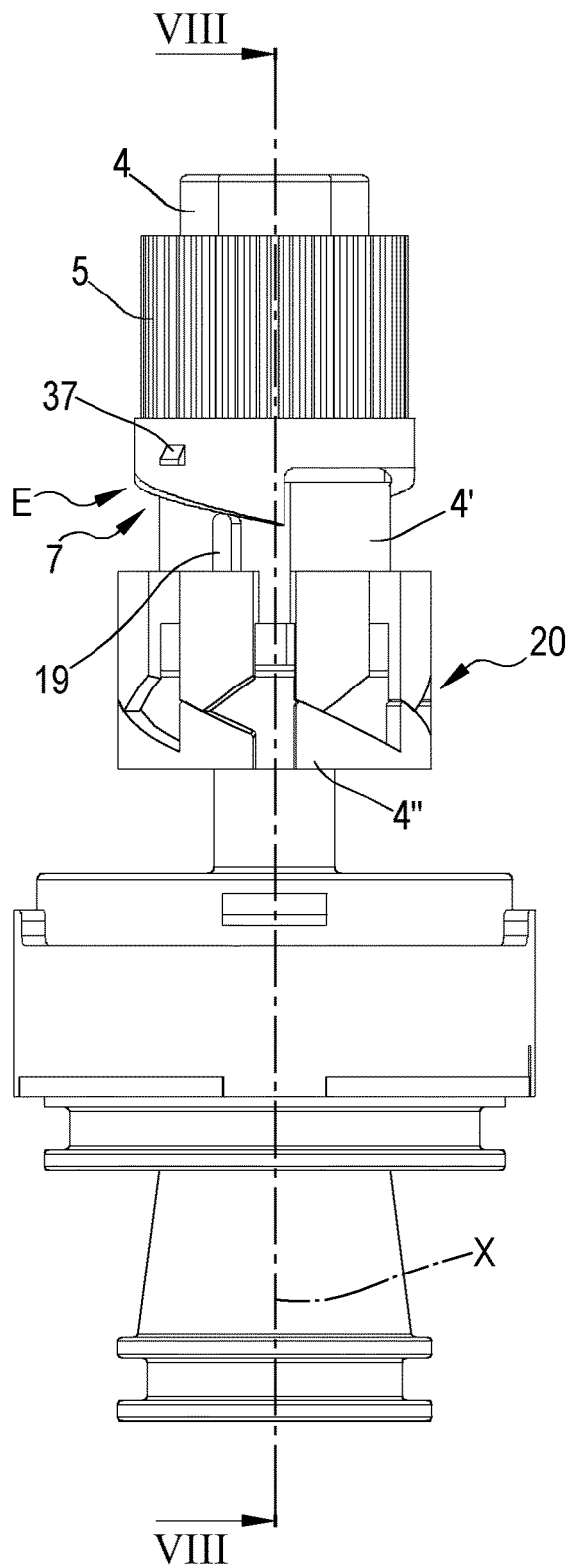
FIG. 7 is a view of a part of the adjustment device in a partial opening position or intermediate position.
Figure 8:
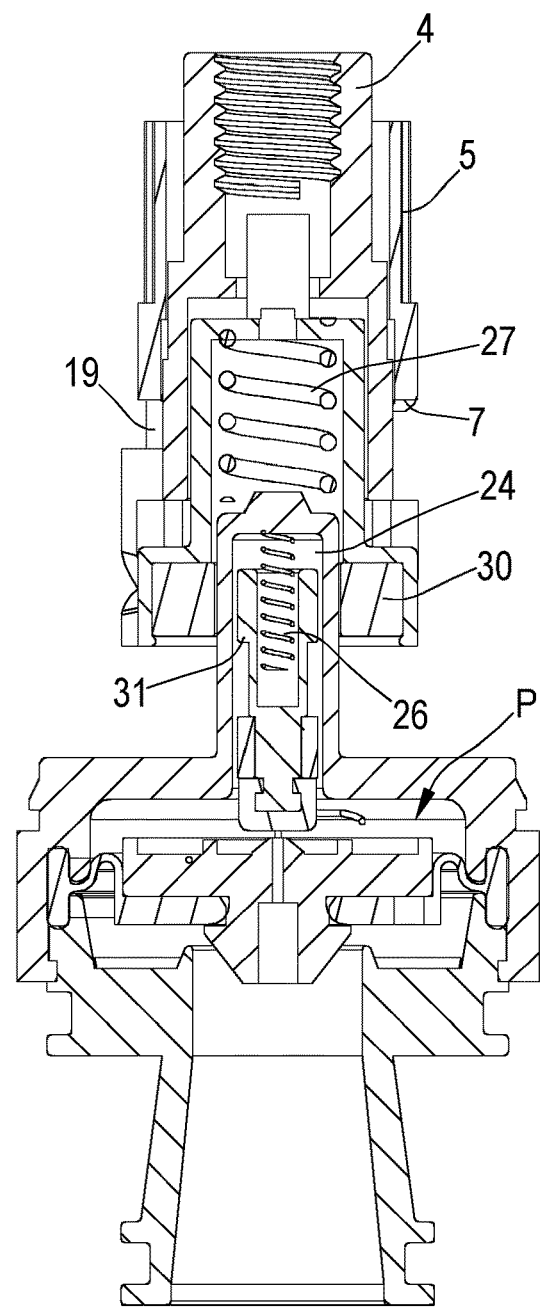
FIG. 8 is a longitudinal section taken along the plane VIII-VIII in FIG. 7.
Figure 10:
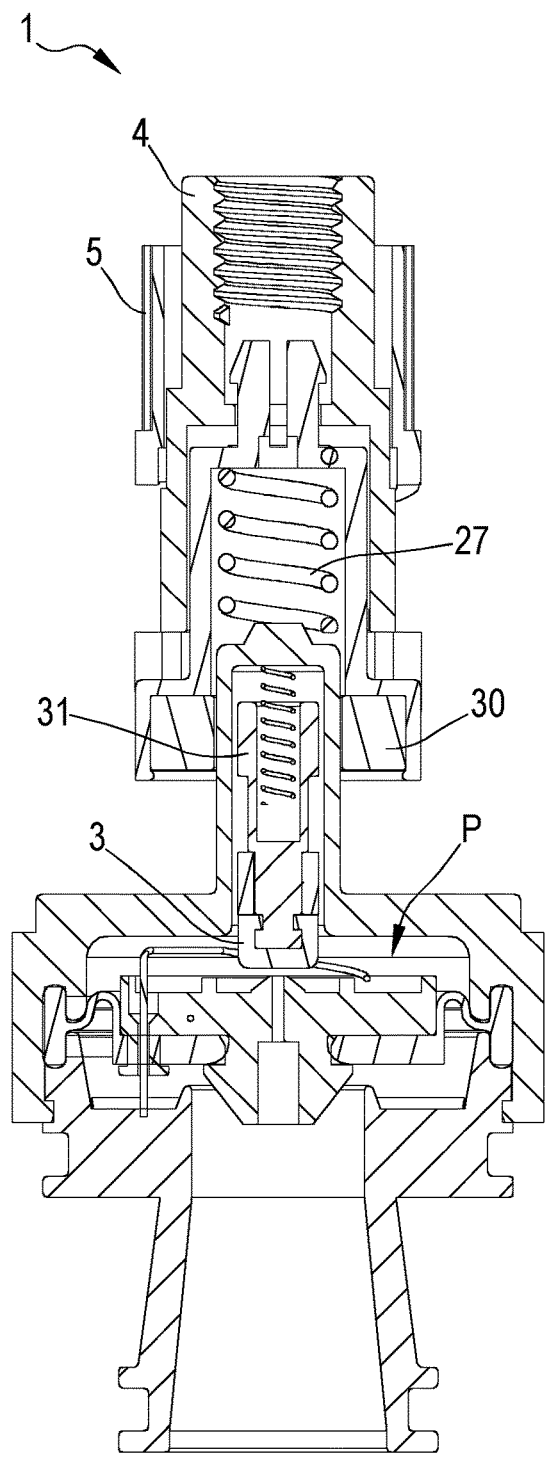
FIG. 10 is a longitudinal section taken along the plane X-X in FIG. 9.
Figure 9:
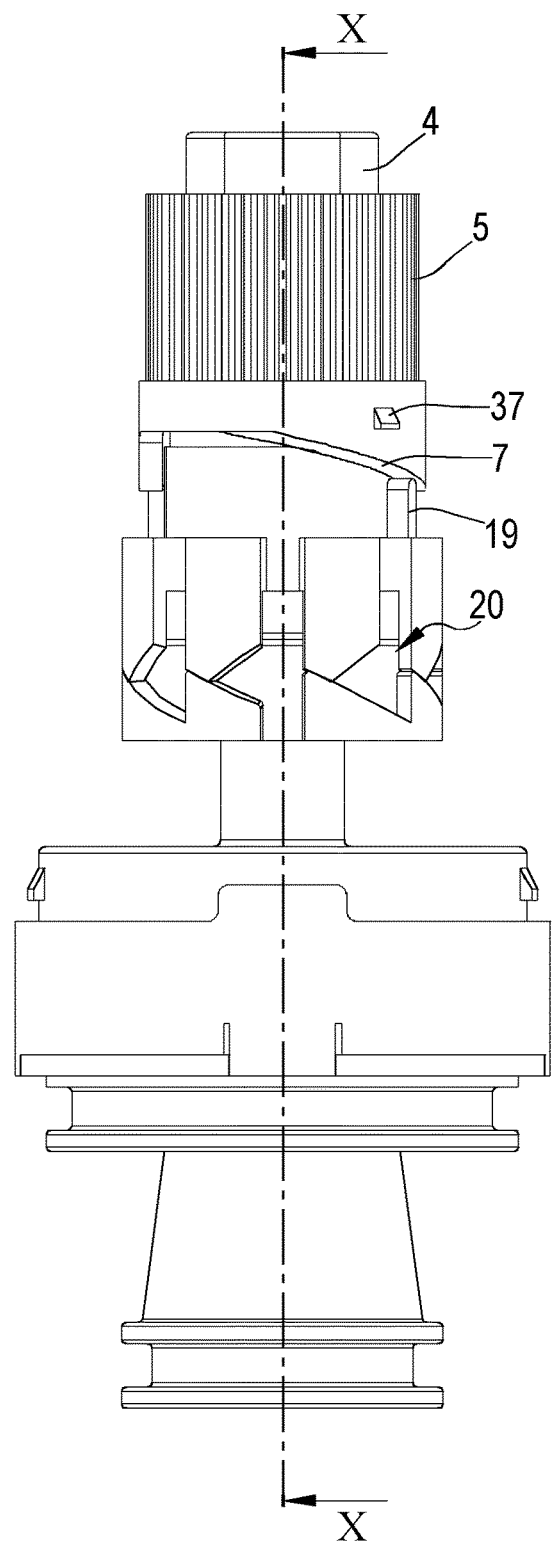
FIG. 9 is another view of a part of the adjustment device in a partial opening position.
Figure 11:
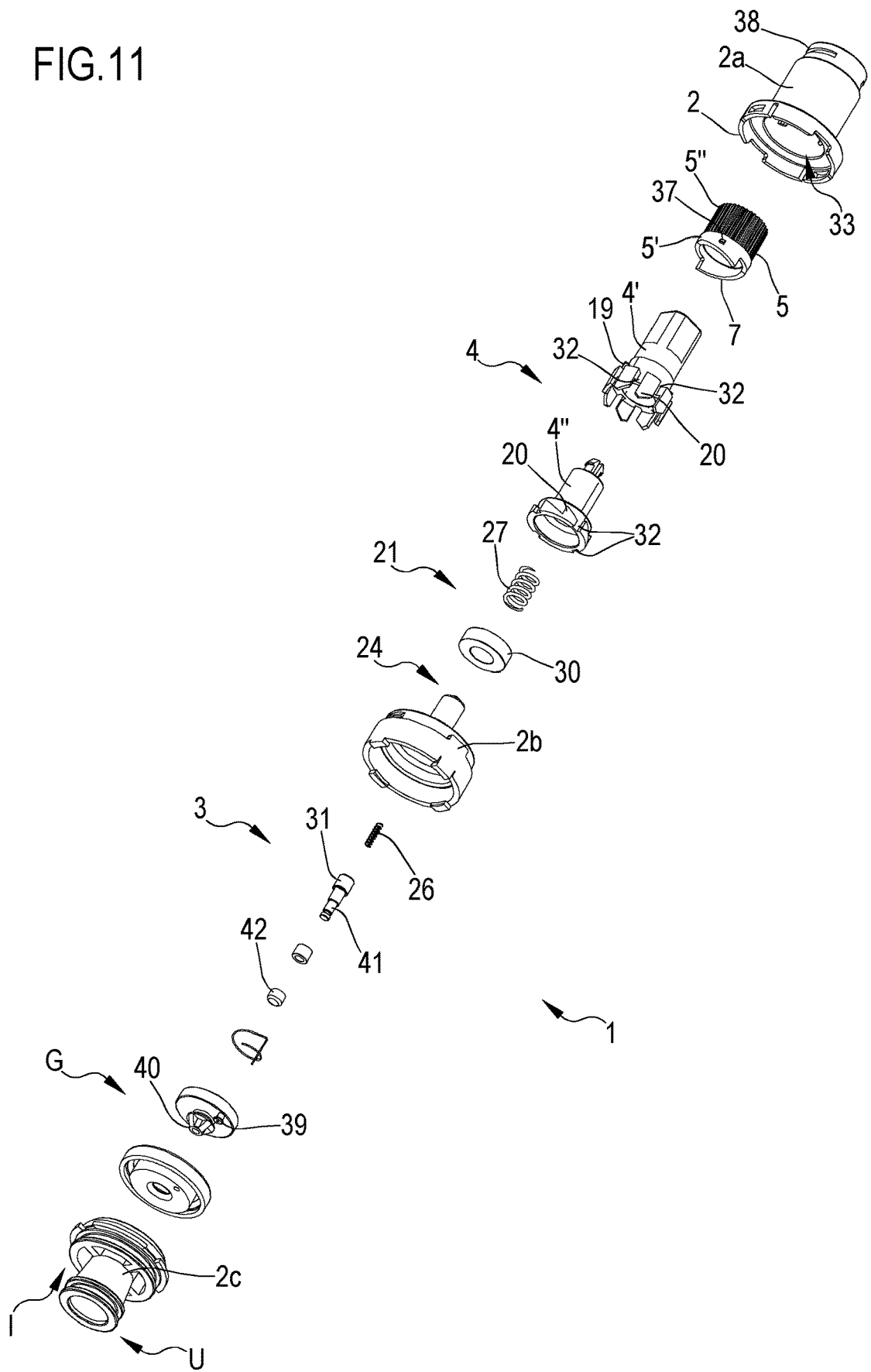
FIG. 11 is another exploded perspective view of the adjustment device without the manual control member.
Figure 13:
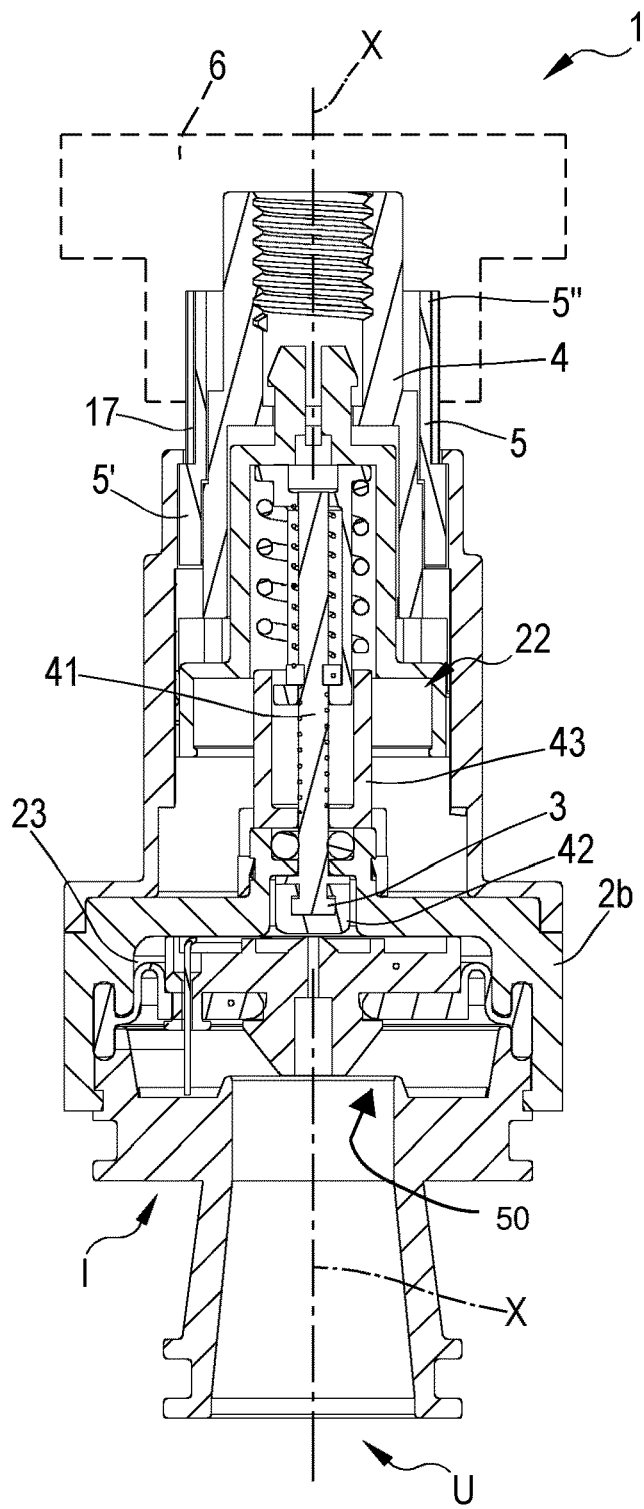
FIG. 13 is a longitudinal section taken along the plane XIII-XIII in FIG. 12.
Figure 12:
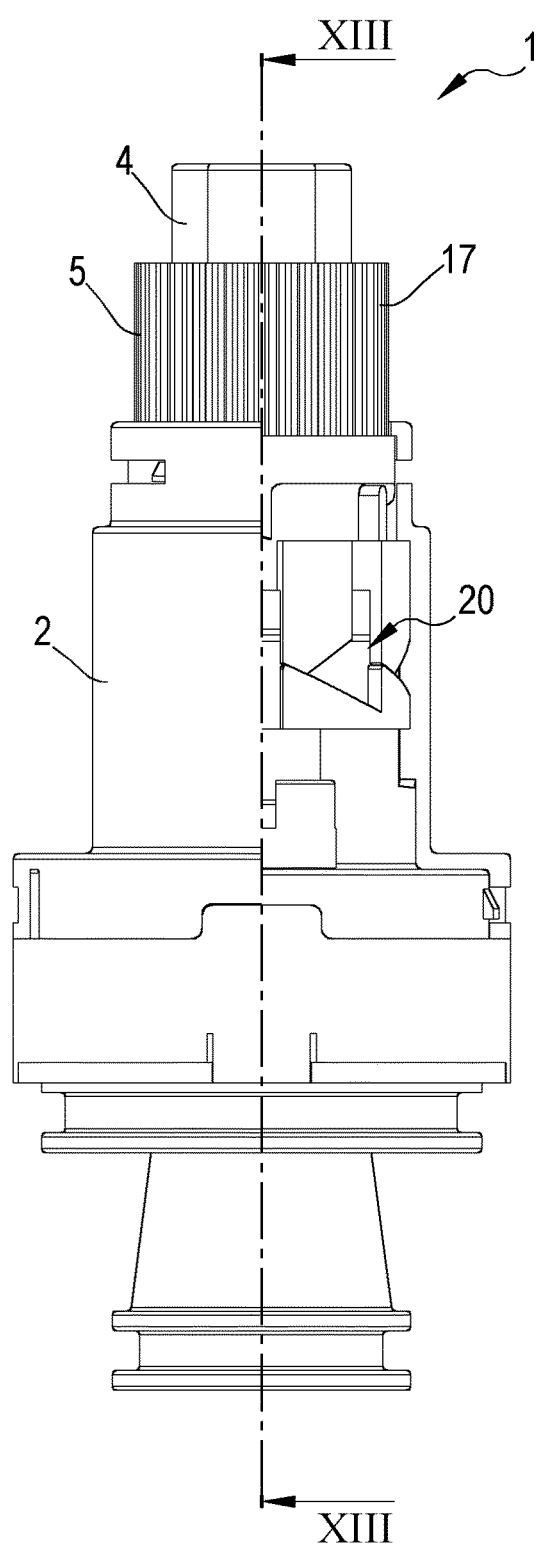
FIG. 12 shows a version of an adjustment device with a mechanical actuation for the shutter arrangement, and in an opening position.
Figure 14:
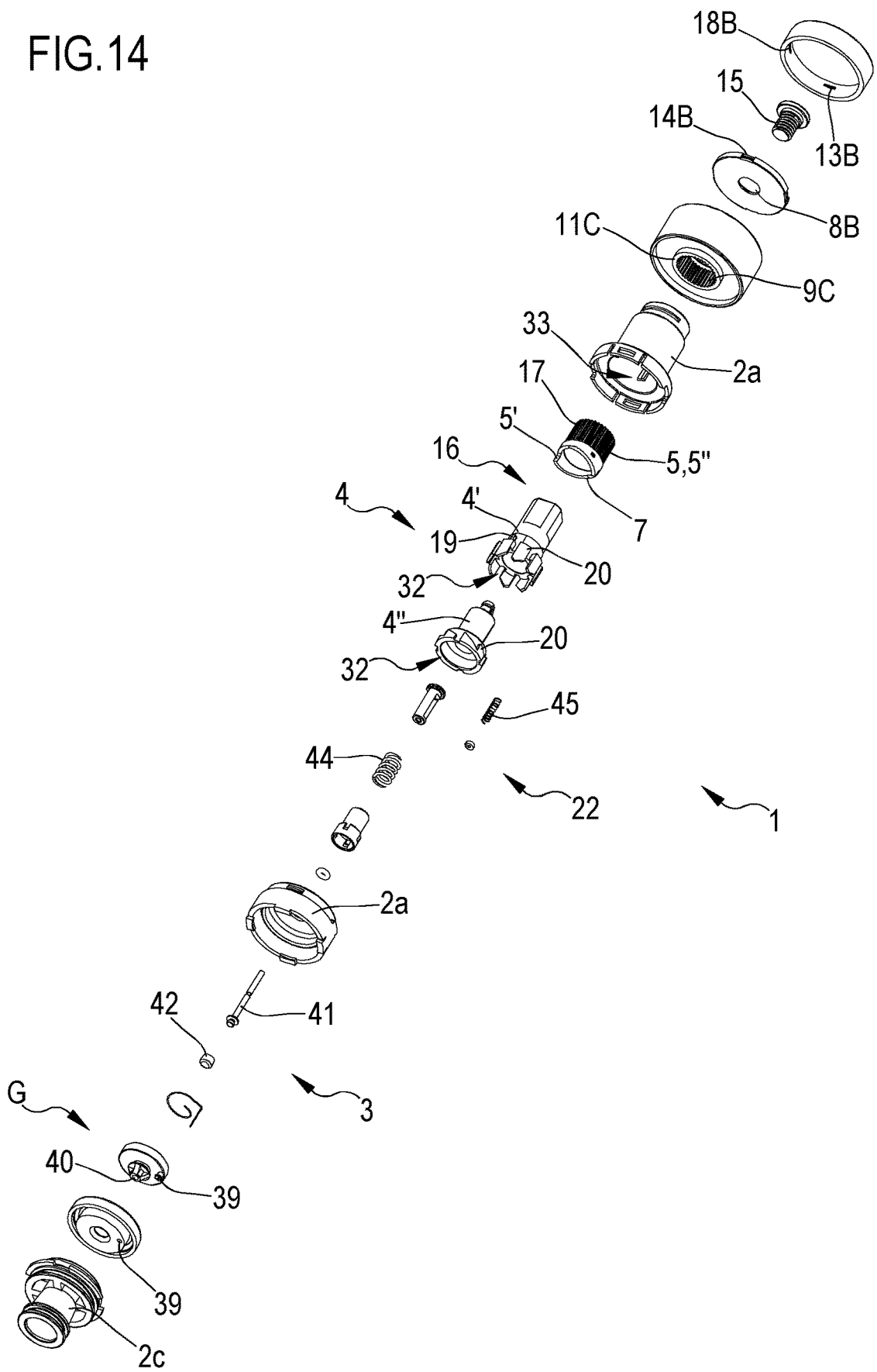
FIG. 14 is an exploded perspective view of the device in FIG. 13 with manual control member.
Figure 16:
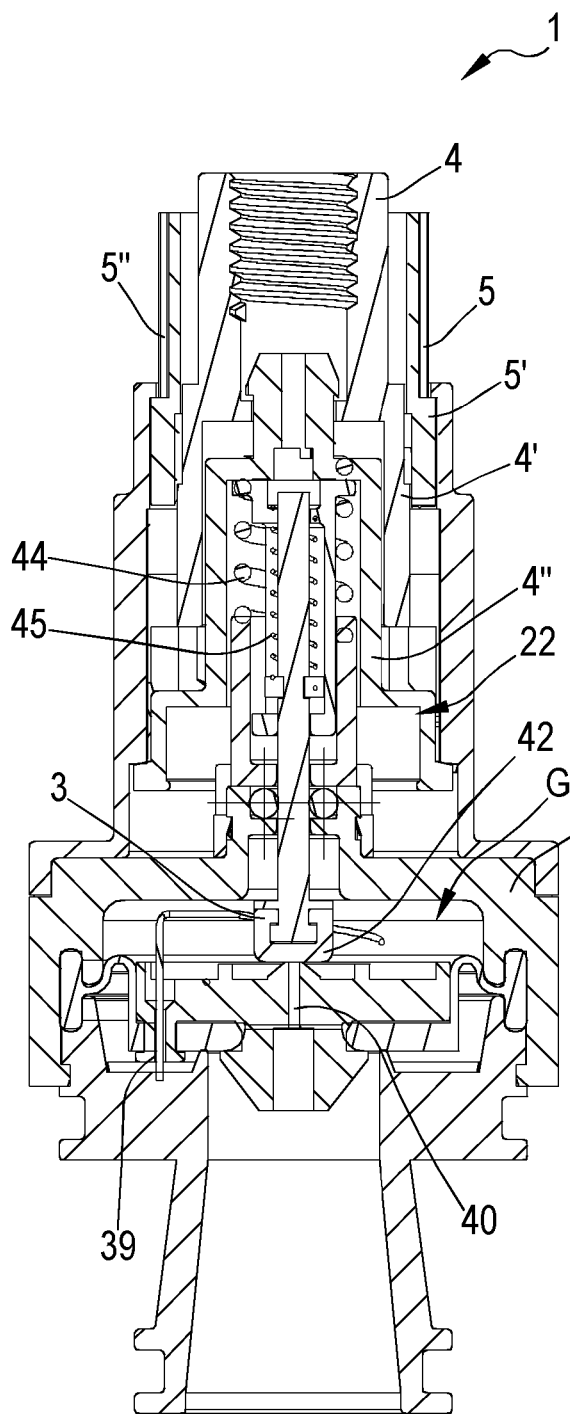
FIG. 16 is a longitudinal section taken along the plane XVI-XVI in FIG. 15.
Figure 15:
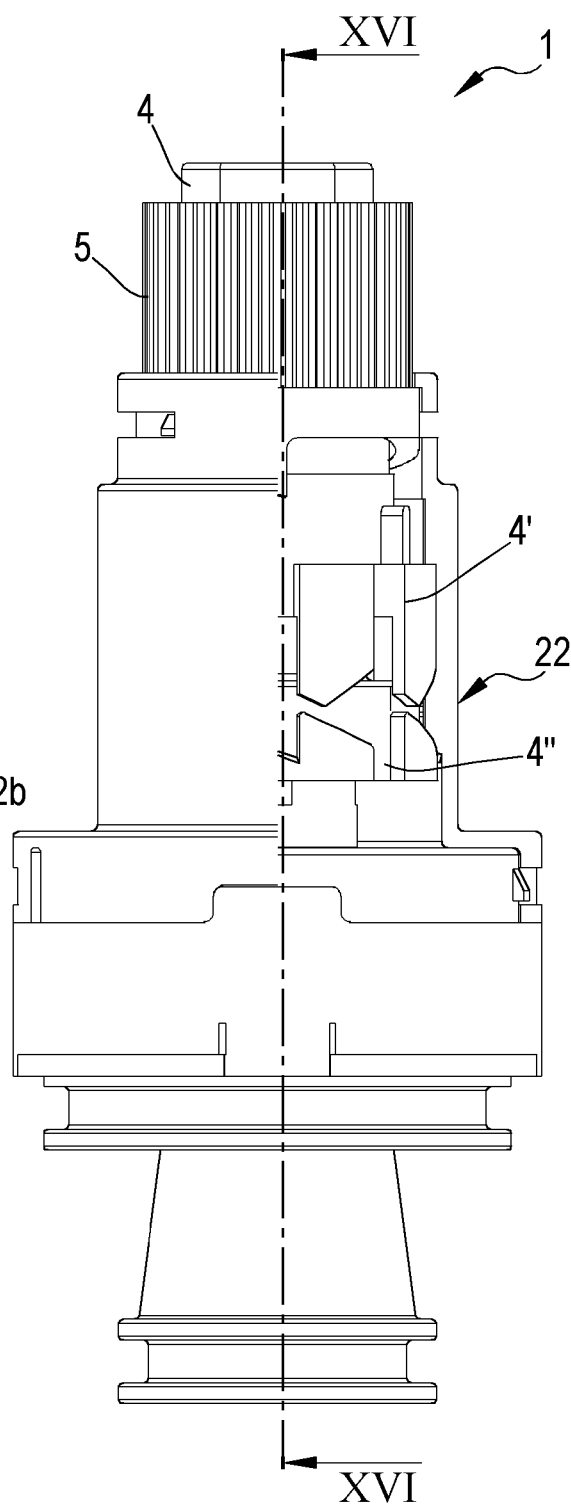
FIG. 15 shows the adjustment device with a mechanical actuation in a closing position.

A possible partial opening position P is shown in FIGS. 7 and 10.

The second actuating member 5 is substantially cylindrical and shaped as a rotatable ferrule element 5.

Such a rotatable ferrule element 5 is not screwed but only housed in an upper seat of the valve body 2 and maintains its position along the longitudinal axis X. In other words, the quota, along the axis X, of the second actuating member 5 (rotatable ferrule element 5) does not vary during the rotation of the second actuating member 5.

This makes it easier to couple with the manual control member 6, furthermore it positively results into a structure simpler and easier to assemble. To be specific, dimensions are remarkably reduced, in particular in a transversal direction and, thanks to the absence of threaded areas for the second actuating member 5, a smaller wall thickness is required both for the second actuating member 5 and for the valve body 2 housing it.

The first actuating member 4 is defined by a first actuating element 4' and a second actuating element 4" intended to interact in contact with each other.

Each of said first actuating element 4' and second actuation element 4" has an elongated shape, extends along the axis X and is defined by a narrow upper part, substantially cylindrical, with a small diameter, and an enlarged lower part, with a larger diameter, extending circularly and transversally with respect to the aforesaid longitudinal axis X.

The second actuating element 4" is fitted on the housing chamber 24 of the second portion 2b of valve body and can slide with respect thereto.

In other words, the housing chamber 24 penetrates into the enlarged lower part of the second actuating element 4" inside which a return spring 27 is provided and arranged to urge the first actuating member 4 away from the second portion 2b of valve body. In other words, the return spring 27 urges the first actuating member 4 upwards (i.e., towards the control member 6) with reference to the enclosed figures.

The first actuating member 4 is structurally configured so that the enlarged lower part of the first element 4' can house therein the narrow upper part, substantially cylindrical, of the second actuating element 4".

In other words, the second actuating element 4", in an assembled condition, is partially and coaxially fitted into the first actuating element 4'.

The second actuating element 4" is therefore partially fitted into the first actuating element 4' and the two elements are connected by a hole-hook coupling 35 (FIG. 6) which allows a relative rotation thereof but prevents separation thereof.

The magnet member 30 is housed in the enlarged lower part of the second actuating element 4".

The magnet member 30, according to a possible non-limiting embodiment, includes a magnet 30 having a toroidal or annular shape, that is fixed inside the enlarged lower part of the second actuating element 4".

The magnet 30 extends circumferentially about, and outside, the housing chamber 24 in which the metallic portion 31 of the shutter arrangement 3 is contained.

The axial movement of the first actuating member 4, and therefore the movement of the magnet 30 integral with it, results—due to the attraction magnetic force exerted—into a corresponding movement of the metallic portion 31, and therefore, of the pin 41 of the shutter arrangement 3.

The metallic portion 31 is not in contact with the magnet 30 but it is separated from it by the interposed wall delimiting the housing chamber 24.

The elastic force of the spring 26, submitted to compression, eases a movement of the pin 41 outside the housing chamber 24 and towards the disc-membrane assembly G.

The dragging magnetic force exerted by the magnet 30 on the metallic portion 31 is selected so as to overcome the effect of the pressure of the fluid inside the reception chamber 23 in a step of ejecting the pin 41 from the housing chamber 24, and so as to overcome the elastic force of the spring 26 in a step of is re-introducing the pin 41 in the housing chamber 24, to reach the position of complete opening A (well visible in the FIGS. 2 to 6).

The first actuating member 4, by a very slight pressure provided to the outermost top by the user, is slidably moved—along the axis X—into the valve body 2. The displacement of the magnet 30, completely separated by the pin 41, determines, by magnetic effect, the displacement of the latter, in an extremely easy, precise and quiet manner.

The first actuating element 4' and the second actuating element 4" mutually engage by respective saw tooth-shaped portions 20 which are obtained on the respective enlarged lower parts mentioned above.

The saw tooth-shaped portions 20 provide interruption zones 32 which engage with respective guide axial protrusions 33 obtained inside the first portion 2a of the valve body.

When the first actuating member 4 is axially moved, the interruption zones 32 slide along the guide axial protrusions 33, which act as rails suitable to prevent a rotation about the longitudinal axis X.

Upon pressing by the user, the second actuating element 4" moves for a given tract only axially, guided by the guide axial protrusions 33 which prevent a rotation thereof, but then the interruption zones 32 of the second actuating element 4" disengage from the guide axial protrusions 33.

Now, the second actuating element 4", that is free to rotate, is urged—due to the interaction between inclined surfaces provided on the saw tooth-shaped portions 20 of the two actuating elements 4', 4"—to rotate of an angular pitch with respect to the first actuating element 4'.

The second actuating element 4", at each angular pitch rotation, is arranged firstly at a position that is farther from the reception chamber 23 (opening position A) and to a position closer to the reception chamber 23 (closing position C) and so on, alternatively.

The saw tooth-shaped portions 20 are geometrically configured such to determine, by mutually cooperating, a snap movement for the first actuating member 4, while switching from the opening position A to the closing position C and vice versa.

The pressure actions applied on the first actuating member 4 determine the positioning in sequence of the second actuating element 4" in the opening position A and in the closing position C, therefore the switching of the shutter arrangement 3 from the opening position A to the closing position C and vice versa alternatively.

Reaching the farthest position or the closest position to the disc-membrane assembly G is made possible thanks to the fact that, in the first case, the second actuating element 4" is angularly oriented with the interruption zones 32 placed at and engaging with the axial protrusions 33 so as to allow the second actuating element 4" to slide towards the top of the adjustment device 1 until leading the first actuating element 4' to abut against the cam arrangement 7 obtained on the second actuating member 5.

The cam arrangement 7 defines the opening end-of-stroke position (in other words they impose the opening position A) for the first actuating member 4, and consequently for the shutter arrangement 3 which are axially dragged by the latter.

In the second case (closest position to the disc-membrane assembly G), the second actuating element 4" is angularly oriented with the interruption zones 32 staggered with respect to, and not engaging with, the guide axial protrusions 33: the saw tooth-shaped portions 20 abut against the axial protrusions 33 therefore retaining the second actuating element 4" and preventing it from returning towards the top of the device 1. The closing position C is thereby maintained.

The first actuating element 4' is axially movable with respect to the ferrule element 5 when it is submitted to a pressure applied by the user.

The second actuating member 5 is partially housed inside the first valve body portion 2a.

Precisely, the second actuating member 5 is defined by a first inner part 5', housed in a seat zone of the first valve body portion 2a, and a second part 5" projecting outwardly from the first valve body portion 2a through a top opening obtained in the latter.

The cam arrangement 7, through which it is possible to adjust the opening A end-of-stroke position of the shutter arrangement 3, as will be explained in detail later, is obtained on the first inner part 5'.

The second part 5" is instead intended to engage with the manual control member 6, to be rotated and to allow adjusting the opening end-of-stroke position for the shutter arrangement 3 and reach a desired partial opening position P (FIG. 10) or intermediate position.

The second actuating member 5 has a hollow shape that is substantially cylindrical-tubular and defining a longitudinal pass-through cavity, that is open at both ends.

The second actuating member 5 thereby contains, or is axially crossed by, a portion of the first actuating member 4, precisely by the first actuating element 4'.

The first actuating element 4' projects outwardly beyond the outermost end of the second actuating member 5, so as to engage with the manual control member 6.

The cam arrangement 7 and how it acts to vary the end-of-stroke position, that is the opening position A of the shutter arrangement 3, is hereinafter described in greater detail.

The cam arrangement includes a shaped edge 7 at an end E of the second actuating member 5, in particular at the lower end of the first part 5', intended to be housed in the valve body 2.

However, according to other versions not shown, it is possible to obtain cam arrangements in other zones of the second actuating member 5, such as inside and near the top of the second actuating member 5, i.e., nearer the zone concerned by the presence of the manual control member 6 intended for the user.

On the first actuating member 4, in particular on the first actuating member 4', a follower relief 19 is obtained that is configured to be in contact with, and follow, the profile of the shaped edge 7.

The profile of the shaped edge 7 is geometrically configured such that the rotation of the second actuating member 5 determines a displacement of the aforesaid follower relief 19 and consequently an axial displacement of the first actuating element 4' along the longitudinal axis X, so as to regulate the opening position A of the shutter arrangement 3.

In particular, the profile of the shaped edge 7, or cam profile 7, is such that, by rotating clockwise the second actuating member 5, the opening end-of-stroke position of the shutter arrangement 3 moves closer to the water discharge hole 40 of the disc-membrane assembly so as to reduce the flow rate of the water exiting through a flow-rate water passage section 50, and vice versa, by rotating anti-clockwise the second actuating member 5, the opening end-of-stroke position of the shutter arrangement 3 moves away from the water discharge hole 40 so as to increase the flow rate of the water flow exiting through the flow-rate water passage section 50.

The cam profile 7 may be geometrically configured as desired providing more or less tilted tracts, based on specific needs/preferences or operation requirements to be fulfilled.

The cam profile may have a progressive or stepped trend, in order to obtain an adjustment of the flow rate that can vary continuously or also discreetly.

Different solutions, though functionally equivalent to the cam arrangement 7 may also be provided.

The rotation of the second actuating member 5, which can be called ferrule element 5 for convenience, is limited thanks to a protrusion 37 obtained on the latter and which projects to engage with an eyelet 38 obtained on the first portion 2a of the valve body. The eyelet 38 extends around the X axis circumferentially for a given angular tract.

The ends of the angular extension arc of the eyelet 38 respectively delimit the extreme angular positions that the rotatable ferrule element 5 can adopt, therefore they determine the maximum and minimum adjustment positions of the flow rate of the exiting water flow.

According to a further possible embodiment which is not shown, in place of the cam arrangement 7, other arrangements to transform a rotation of the second actuating member 5 into a displacement of the shutter arrangement 3 to regulate the end-of-stroke in the opening position A may be provided—between the second actuating member 5 and the shutter arrangement 3 and/or the first actuating element 4'.

The manual control member 6, 6A, 6B, 6C will now be described more in detail.

Referring in particular to FIG. 3, a first version of the aforesaid manual control member 6, 6A is described.

According to this first version, the manual control member 6 is defined by a single control element 6A made in a single piece.

Such single element is adapted to receive a pressure action, applied by a user, along the longitudinal axis X (to open and close the water delivery) and a rotation action about the same longitudinal axis X (to regulate the flow rate of water to be delivered).

The manual control member includes a coupling portion 8A duly shaped to allow connection to the first actuating member 4, and an engagement portion 9A duly shaped to engage with the second actuating member 5.

In particular, the coupling portion includes a pass-through hole 8A shaped to receive a fixing element 15, such as a screw, suitable for engaging in a fixing cavity 16 obtained on the first actuating member 4.

The single control element 6A is hood-shaped and includes a discoid part 10A, on which the aforementioned coupling portion 8A is obtained, and a tubular part 11A which projects from a surface 12 of the discoid part 10A. The engagement portion 9A is obtained on the tubular part 11A.

The aforesaid engagement portion includes a shaped surface 9A configured to engage with a corresponding conjugated shaped surface 17 obtained on the second actuating member 5.

The shaped surface 9A includes raised and/or recessed elements configured to engage with respective recessed and/or raised elements of the shaped conjugated surface 17 of the second actuating member 5 (ferrule element 5).

According to a possible non-limiting embodiment, the raised and/or recessed elements include ribs and/or grooves extending parallel to the longitudinal axis X.

The manual control member 6 includes an aesthetic finishing cover element 13A, having a button conformation, suitable to receive a touch action by the user.

The finishing cover element 13A is provided with hooking elements 18A shaped to couple with holding zones 14A obtained on the control member 6, 6A.

The adjustment device 1 is provided with a fixing ferrule 25 by means of which it may be tightly constrained to a sink counter-top or to a shower panel.

The adjustment device 1 is configured to be mounted as hidden, with the only cover element 13A as visible and facing the user when it is in the closing position C.

In particular, a mounting configuration that is flush with the surface S of the shower panel or the sink counter-top may be chosen.

Figures 5, 6:
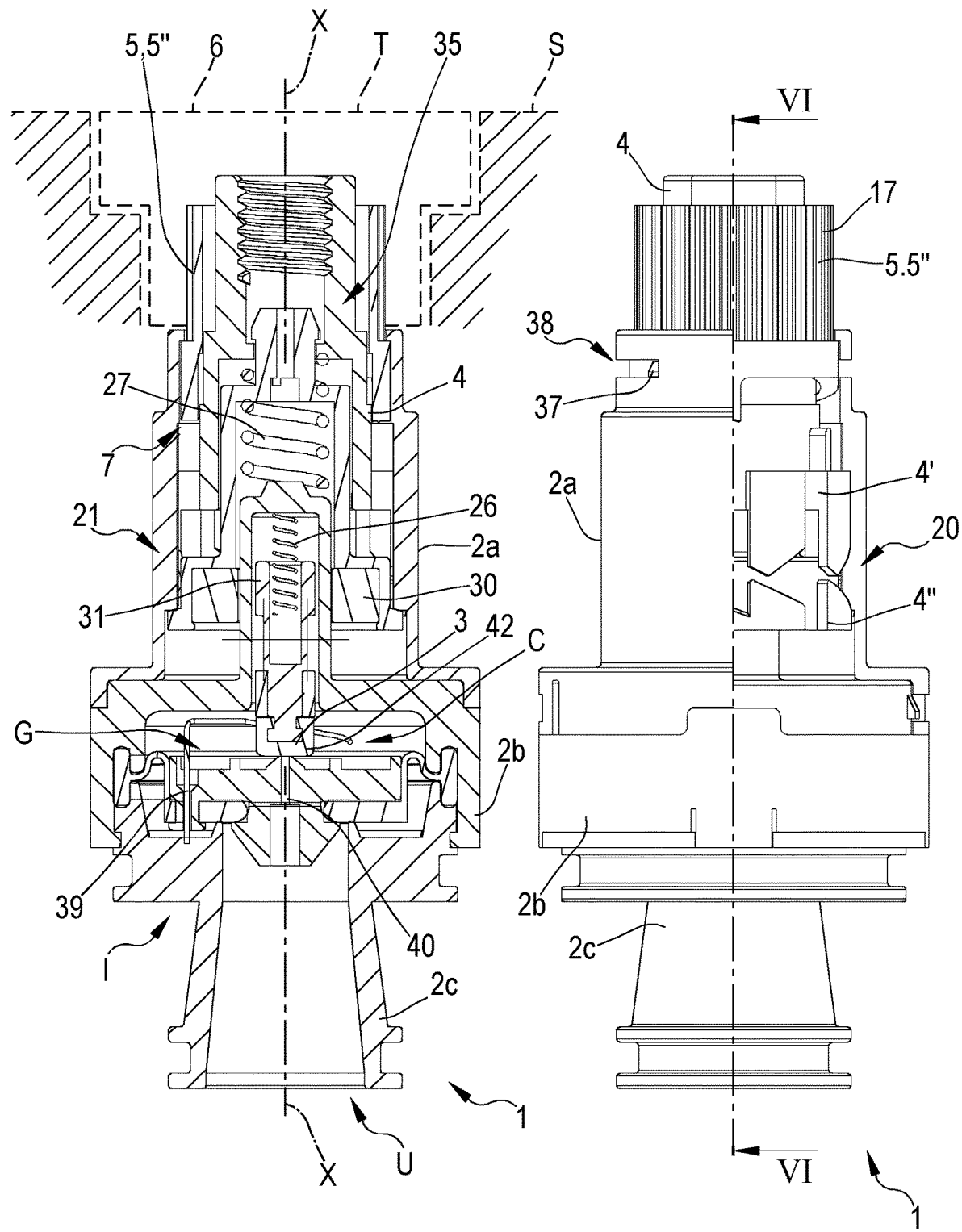
FIG. 5 shows the adjustment device according to the invention in a closing position for the water flow.
FIG. 6 is a longitudinal section taken along the plane VI-VI in FIG. 5.

As schematically shown in FIG. 6, when the adjustment device 1 is in the closing position C, the cover element 13A has a top surface T which is flush with, and perfectly planar to the surface S of the shower panel or the sink counter-top.

Upon an opening pressure being applied by the user, the cover element 13A projects outwardly beyond the surface S to allow the user to grab and rotate the cover element 13A, i.e., the control member 6A.

The control member 6A, in particular, the cover element 13A may be small, it may have an outer surface having an extension almost equal or greater than a finger pressing area, so as to have a minimal and elegant aesthetic appearance.

On the upper surface of the cover element 13A, in case it is sized such to be greater than a user finger, a recessed zone or depression may also be obtained in a de-centred zone, to allow rotating the cover element 13A itself by means of a finger.

A clockwise rotation or an anti-clockwise rotation of the control member 6A, with respect to the valve body 2, may be carried out while delivering water, enabling to adjust in real time the flow rate delivered, or in the closing condition (no water delivery); in such a case it is possible to set up the delivery flow rate prior to the opening of the adjustment device 1.

The adjustment device 1 thus configured, in addition to the fact that it is highly comfortable, is also characterized by being aesthetically very pleasant.

Figure 4:
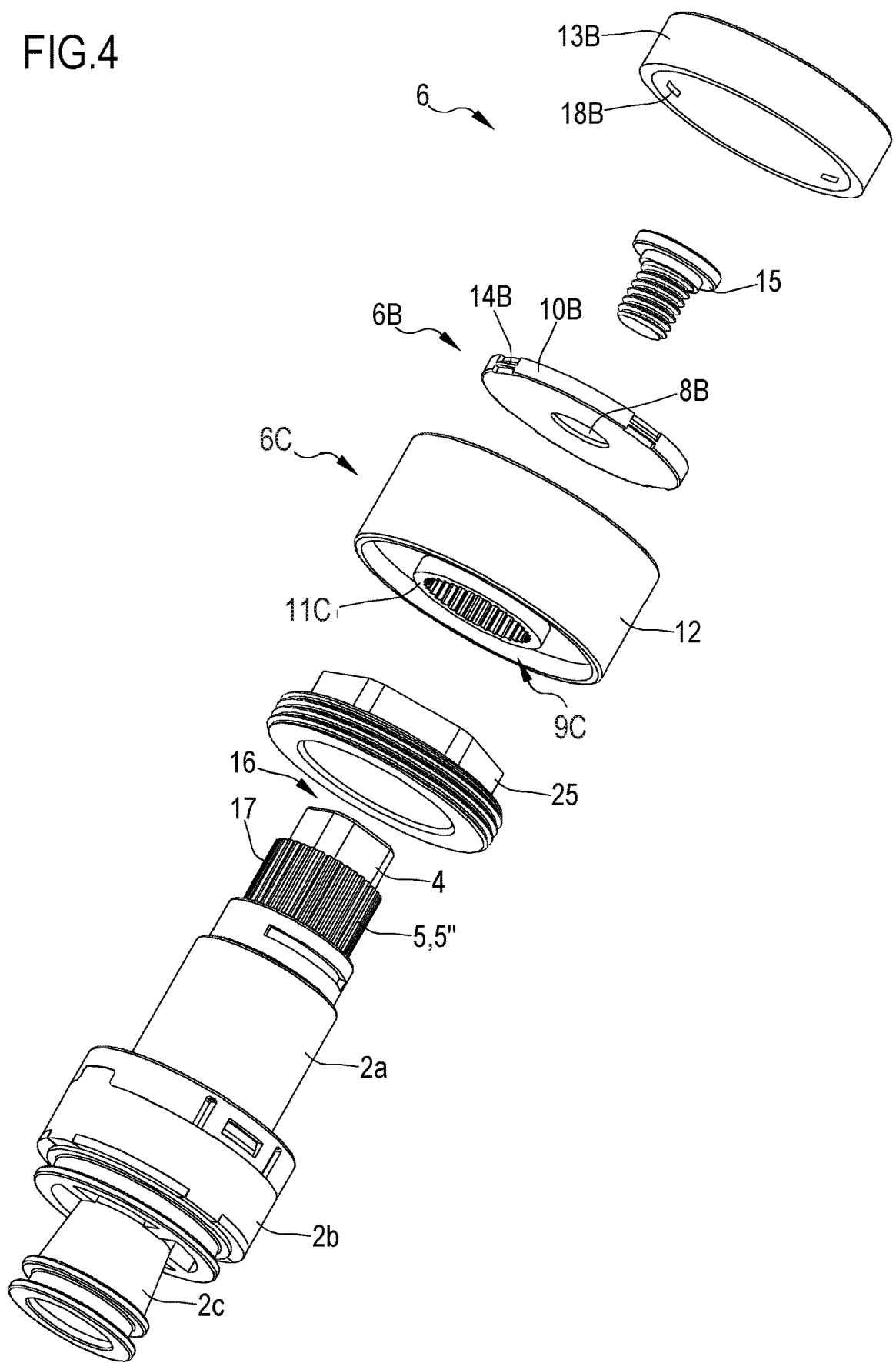
FIG. 4 is an exploded perspective view of the device in FIG. 1 provided with a second version of a manual control member.

Referring to FIG. 4, a second version will now be described of the aforesaid manual control member 6, 6B, 6C which shares many features with the first version just described and, for this reason, they will not be described anew.

According to this version, the manual control member is defined by a first control element 6B and a second control element 6C, that are distinct and separated from each other.

The first control element 6B is suitable to receive only the axial pressure action applied by the user for opening and closing the water delivery and is configured to couple with the first actuating member 4.

The second control element 6C is suitable for receiving a rotation action by the user and is configured to engage with the second actuating member 5 (actuating ferrule element 5) to allow adjusting the flow rate of the water to be delivered.

The first control element 6B is defined by a discoid part 10B on which a coupling portion 8B is obtained for fixing to the first actuating member 4 by means of a screw 15 or an equivalent arrangement.

The second control element 6C includes an innermost tubular part 11C—on which the engagement portion 9C for coupling with the actuating ferrule element 5 is obtained—and an outermost knob part 12, intended to be grabbed and rotated by the user around the longitudinal axis X so as to rotate the actuating ferrule element 5.

On the outer cylindrical surface of the knob part 12 it is possible to obtain a knurl or raised and/or recessed elements or still other elements to increase and ease the grip and rotation by the user.

Other features, such as the hooking elements 18B, the engagement portion 9C, are shaped in a way at all similar to the previously disclosed version.

Referring to the FIGS. 12 to 18, another version of the adjustment device 1 having a mechanical actuation is shown.

Several components of such a device are identical or similar to those disclosed for the magnetic actuation device 1, therefore, for ease of explanation, they will not be described nor mentioned anew.

What disclosed with reference to the manual control member 6 is also true for this version of mechanical actuation adjustment device 1; therefore, it must be understood that the control member 6, described according to two different versions respectively shown in FIGS. 3 and 4, is applied also to the following mechanical actuation adjustment device 1.

In this version, between the shutter arrangement 3 and the first actuating member 4 a mechanical-type transmission assembly 22 is interposed, that is configured to mechanically transmit an axial movement of the movement of first actuating member 4 to the shutter arrangement 3.

Figure 18:
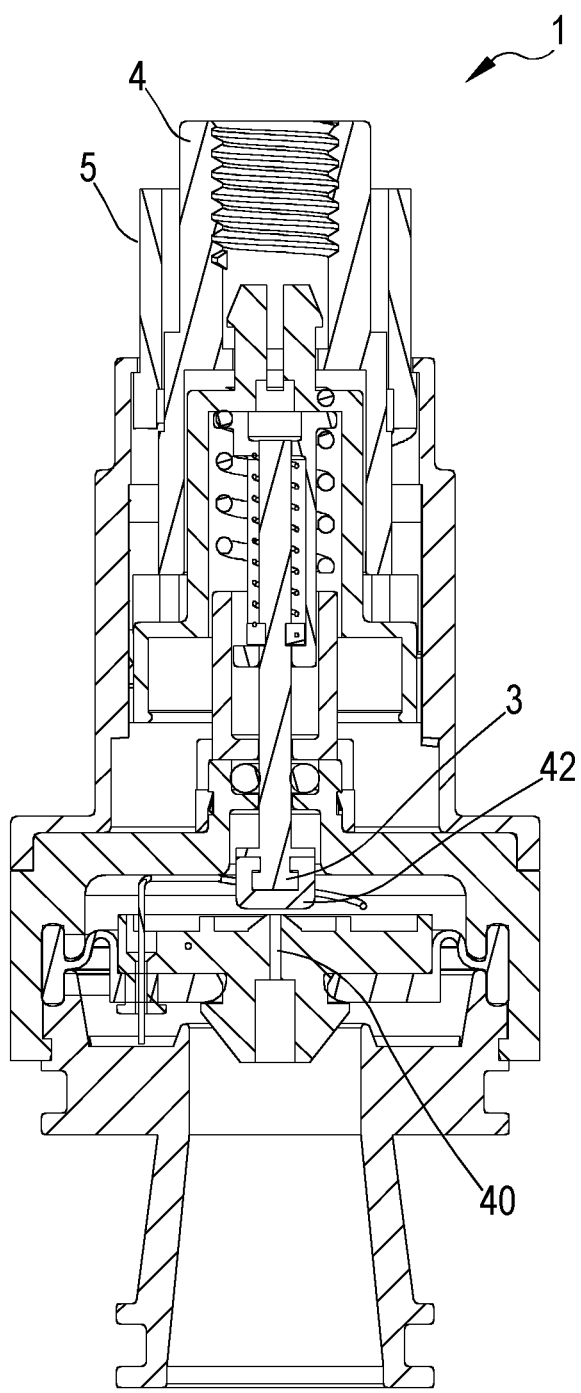
FIG. 18 is a longitudinal section taken along the plane XVIII-XVIII in FIG. 17.
Figure 17:
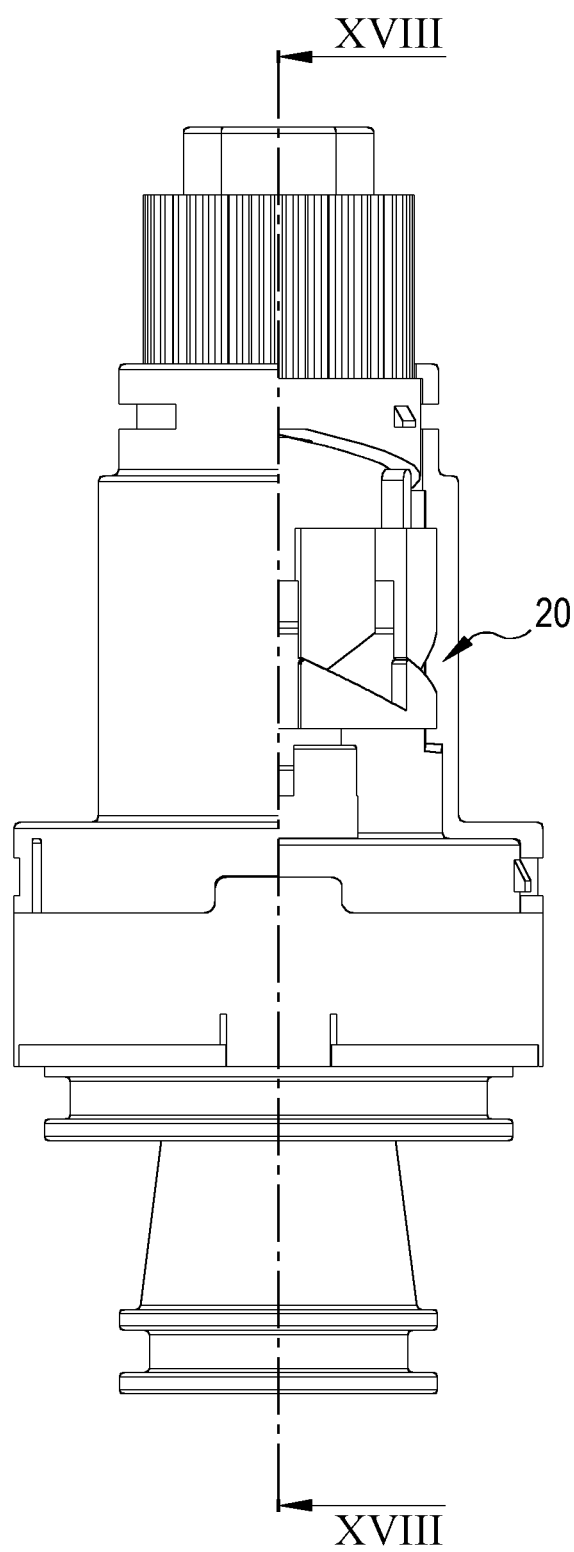
FIG. 17 is another view of a part of the adjustment device with mechanical actuation in a partial opening position.

Thanks to the transmission assembly 22, the shutter arrangement 3 may be arranged in the complete opening position A (FIG. 13), in the closing position C (FIG. 16) or in a desired and adjustable partial opening position 1A (FIG. 18).

In this case, the second portion 2b of the valve body is slightly different with respect to the version of the magnetic actuation device 1 and has a chamber element 43 fixed to the transversal part delimiting on top the reception chamber 23.

Inside the chamber element 43, the pin 41 of the shutter arrangement 3, which is connected on top with the first actuating member 4, in particular with the top of the actuating element 4", is slidably movable.

A spring 44 urging upwards the first actuating member 4, and a further smaller spring 45, urging the pin 41 downwards, are provided. Suitable washers in contact with the pin 41 prevent fluid leakages.

The operation of the first actuating member 4 and of the second actuating member 5 is at all similar to what described referring to the mechanical actuation adjustment device 1.

It is thus clear from what described and shown in the enclosed drawings that the adjustment device 1 according to the invention reaches successfully all the above-stated objects.

The adjustment device 1 improves the actuation of the shutter arrangement 3, significantly facilitating the opening, closing and water flow adjustment operations for the user.

Thanks to the solution according to the invention, the adjustment device 1 is constructively simpler and at the same time has improved operation performance.

The dimensions of the device 1 and the space required for mounting it on a shower panel or another similar wall of a delivery unit are smaller, making it possible to improve its appearance, in particular referring to the possibility of obtaining a mounting configuration as hidden or perfectly flush with the wall surface or shower panel.

The present adjustment device, thanks to the manual control, the actuating members and the cam arrangement, has a reliable, precise and quiet operation.

Thanks to the specific configuration of the second actuating member 5, in particular thanks to the cam arrangement 7, a more effective kinematic operation is obtained.

The cam arrangement 7 substantially allows a greater freedom of geometrical configurations and make it possible to obtain a greater or lower amplification effect of the axial displacement of the shutter arrangement 3 as a response to a minimum rotation of the second actuating member 5.

Furthermore, the above-described structural configuration allows to significantly reduce the overall dimensions, especially transversally, making the adjustment device 1 easier to be mounted and more aesthetically nicer.

What stated and shown in the enclosed drawings was provided to illustrate the innovative features of the adjustment device 1 according to more possible embodiments; other modifications may be implemented to the various apparatus versions, or parts thereof, without departing from the claims.

In practice, the materials, as long as they are compatible with the specific use and the respective single components they are intended for, may be suitably selected depending on the requirements and depending on the prior art available.

It is possible to configure and to size the adjustment device 1 and adopt materials according to the needs, and variants and/or additions to what described above and shown in the enclosed drawings are possible.

The invention claimed is:

1. Adjustment device for a water delivery unit for showers, sinks and other structures, including:
    a valve body extending along a longitudinal axis and provided with an inlet and an outlet for water,
    a shutter arrangement configured to control a water flow from said inlet to said outlet for water,
    a first actuating member axially movable along said longitudinal axis to arrange said shutter arrangement into an opening position and into a closing position to respectively enable/disable the passage of said water flow;
    a second actuating member rotatable about said longitudinal axis to vary said opening position of said shutter arrangement so as to adjust a flow rate of the water flow exiting said valve body;
    a manual control member coupling with both said first actuating member and with said second actuating member and configured to receive a manual action by a user for opening, closing and adjusting the flow rate of said water flow, said manual control member including a cover element intended to be visible and facing the user in said closing position,
    said second actuating member cooperating with said shutter arrangement through a cam arrangement for varying said opening position of said shutter arrangement, wherein:
        said manual control member includes a coupling portion configured to connect with said first actuating member, and an engagement portion configured to engage with said second actuating member, and
        the adjustment device is configured to be mounted as hidden with a top surface of the cover element which is flush with, and perfectly planar to a surface of a shower panel or a sink counter-top.

2. Adjustment device according to claim 1, wherein said second actuating member is housed in a thread-free seat zone of said valve body such that said second actuating member maintains, while being used, a same height along said longitudinal axis, regardless of the rotation provided to said second actuating member.

3. Adjustment device according to claim 1, wherein said manual control member is defined by a single control element made in a single piece and suitable for receiving a pressure action, by a user, along said longitudinal axis for opening/closing water and a rotating action about said longitudinal axis for adjusting the flow rate of the exiting water flow.

4. Adjustment device according to claim 3, wherein said single control element is hood-shaped and includes a discoid part, on which said coupling portion is obtained, and a tubular part projecting from a surface of said discoid part, said engagement portion being obtained on said tubular part.

5. Adjustment device according to claim 2, wherein said coupling portion includes a through opening shaped to receive a fixing element suitable for engaging in a fixing cavity obtained on said first actuating member, the fixing element including a screw.

6. Adjustment device according to claim 2, wherein said engagement portion includes a shaped surface configured to engage with a corresponding conjugated shaped surface obtained on said second actuating member.

7. Adjustment device according to claim 6, wherein said shaped surface includes raised and/or recessed elements configured to engage with respective recessed and/or raised elements of said conjugated shaped surface.

8. Adjustment device according to claim 7, wherein said raised and/or recessed elements include ribs and/or grooves extending parallel to said longitudinal axis.

9. Adjustment device according to claim 1, wherein said manual control member is defined by a first control element suitable for receiving a pressure action along said longitudinal axis by a user and configured to engage with said first actuating member, and a second control element, suitable for receiving by the user a rotating action about said longitudinal axis, said second control element being configured to engage with said second actuating member, said first control element and said second control element being distinct and separated from each other.

10. Adjustment device according to claim 9, wherein said first control element is defined by a discoid part on which said coupling portion is obtained, and wherein said second control element includes an innermost tubular part—on which said engagement portion is obtained—and an outermost knob part intended to be grabbed and rotated by the user about said longitudinal axis so as to rotate said second actuating member for adjusting the flow rate of water delivered.

11. Adjustment device according to claim 1, wherein said manual control member includes a finishing cover element, having a button shape, suitable for receiving a touch action by the user, said adjustment device being shaped such that, in a condition mounted on a shower panel or sink wall, said finishing cover element is installed as hidden, and wherein a top surface of said finishing cover element is, in said closing position, flush with a surface of said shower panel or sink wall.

12. Adjustment device according to claim 11, wherein said finishing cover element is provided with hooking elements shaped to couple with holding zones obtained on said control member.

13. Adjustment device according to claim 1, wherein said cam arrangement includes a shaped edge obtained at an end of said second actuating member, and wherein on said first actuating member a follower relief is obtained that is configured to contact, and follow the profile of said shaped edge, the rotation of said second actuating member determining a displacement of said follower relief and consequently an axial displacement of said first actuating member along said longitudinal axis, so as to adjust the opening position of said shutter arrangement.

14. Adjustment device according to claim 13, wherein said shaped edge is configured such that, by rotating clockwise said second actuating member, the opening end-of-stroke position of said shutter arrangement moves closer to a water discharge hole so as to reduce the flow rate of water exiting through a flow-rate water passage section, and vice versa, by rotating anticlockwise said second actuating member, the opening end-of-stroke position of said shutter arrangement moves away from said water discharge hole so as to increase the flow rate of the water flow exiting through said flow-rate water passage section.

15. Adjustment device according to claim 14, wherein a disc-membrane assembly is provided in which a water inlet hole and said water discharge hole are defined, and wherein said shutter arrangement includes a washer end configured to shut, in said closing position, said water discharge hole.

16. Adjustment device according to claim 1, wherein said first actuating member is defined by a first actuating element and by a second actuating element mutually engaging by means of respective saw tooth-shaped portions configured to define a snap movement for said first actuating member from said opening position to said closing position and vice versa.

17. Adjustment device according to claim 1, further including a ferrule for fixing said water delivery unit to a wall.

18. Adjustment device according to claim 1, wherein between said shutter arrangement and said first actuating member a magnetic-type transmission assembly is interposed that is configured to transmit the movement of said first actuating member to said shutter arrangement, wherein said transmission assembly includes a magnet member cooperating as a metal or ferromagnetic portion of said shutter arrangement.

19. Adjustment device according to claim 1, wherein between said shutter arrangement and said first actuating member a mechanical-type transmission assembly is interposed, that is configured to mechanically transmit an axial movement of said movement of first actuating member to said shutter arrangement.

* * * * *